United States Patent [19]

Nees et al.

[11] 3,959,766

[45] May 25, 1976

[54] TARGET SIMULATOR SYSTEM

[75] Inventors: Donald M. Nees, Tacoma; Alan L. Lindstrum, Port Blakely; Michael L. Barlow, Silverdale, all of Wash.

[73] Assignee: The United States of America as represented by the Secretary of the Navy, Washington, D.C.

[22] Filed: Sept. 26, 1974

[21] Appl. No.: 509,526

[52] U.S. Cl. ................................ 340/3 E; 340/3 D; 340/5 D; 35/10.4
[51] Int. Cl.² ...................... G09B 9/00; G01S 9/66
[58] Field of Search ............. 340/3 E, 3 D, 5 C, 5 D; 325/11; 35/10.4; 343/17.7

[56] References Cited
UNITED STATES PATENTS

| | | | |
|---|---|---|---|
| 2,706,285 | 4/1955 | Scott | 340/5 C |
| 2,874,273 | 2/1959 | Jacobsen | 325/11 |
| 3,154,170 | 10/1964 | Noiseux | 340/5 C |
| 3,164,659 | 1/1965 | Abrams | 340/5 D X |
| 3,555,165 | 1/1971 | Ettenhofer et al. | 340/5 D X |
| 3,624,596 | 11/1971 | Dickenson | 340/3 R |
| 3,745,579 | 7/1973 | Lott | 343/17.7 |

Primary Examiner—Richard A. Farley
Attorney, Agent, or Firm—R. S. Sciascia; Charles D. B. Curry

[57] ABSTRACT

A target simulator system that may be suspended in the ocean to simulate a moving target to a homing weapon. The system includes a receiving transducer for receiving an acoustic signal transmitted by the homing weapon. The acoustic signal is then amplified, doppler shifted, filtered and then retransmitted by a transmitting transducer to the homing weapon. The doppler shift may be selected to have the retransmitted signal simulate a target that is moving towards or away from the homing weapon. The system includes a power compensating circuit and a monitor circuit to assure that the target simulator system is operating within acceptable amplification limits.

4 Claims, 4 Drawing Figures

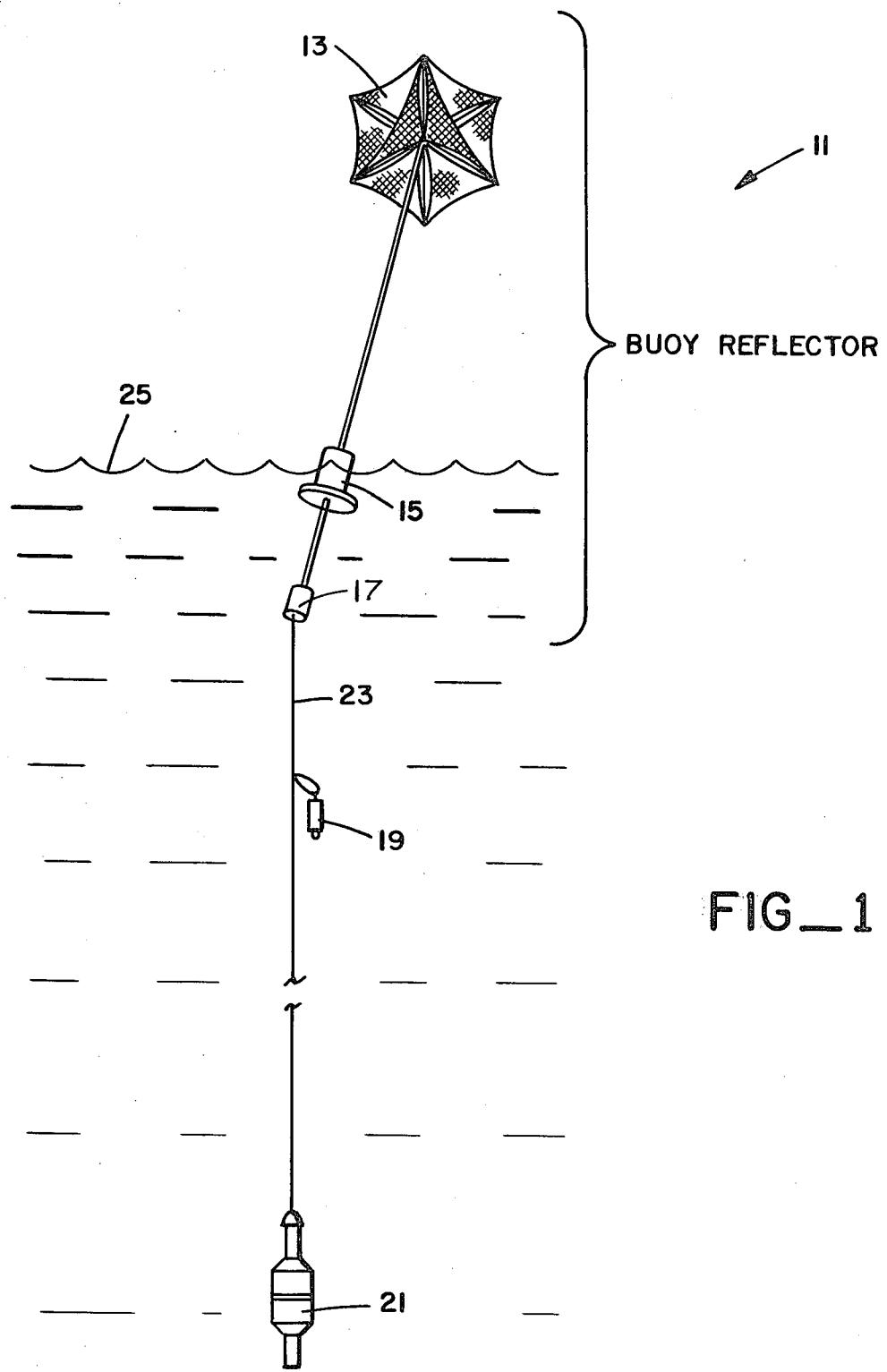
FIG_1

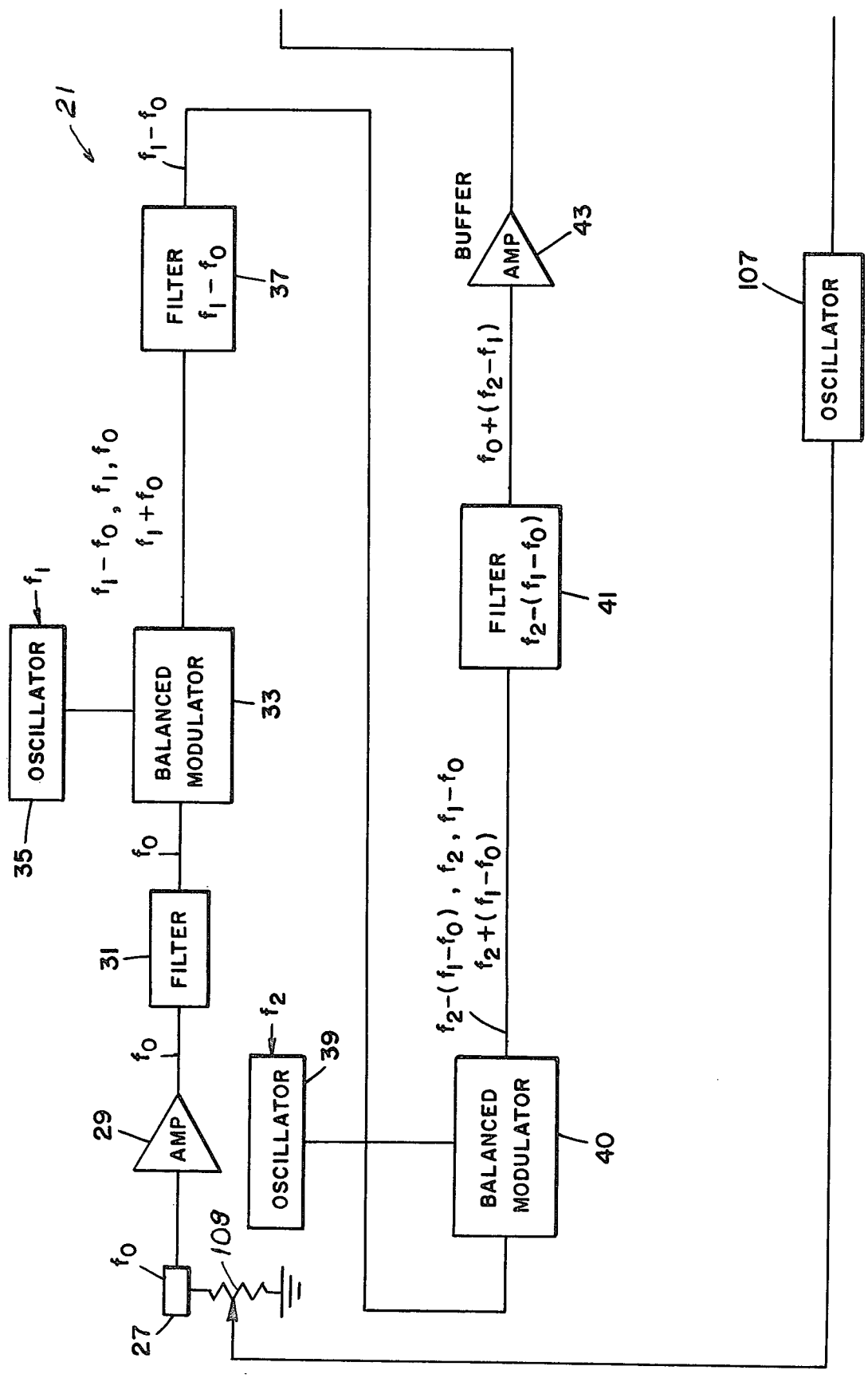
FIG._2A

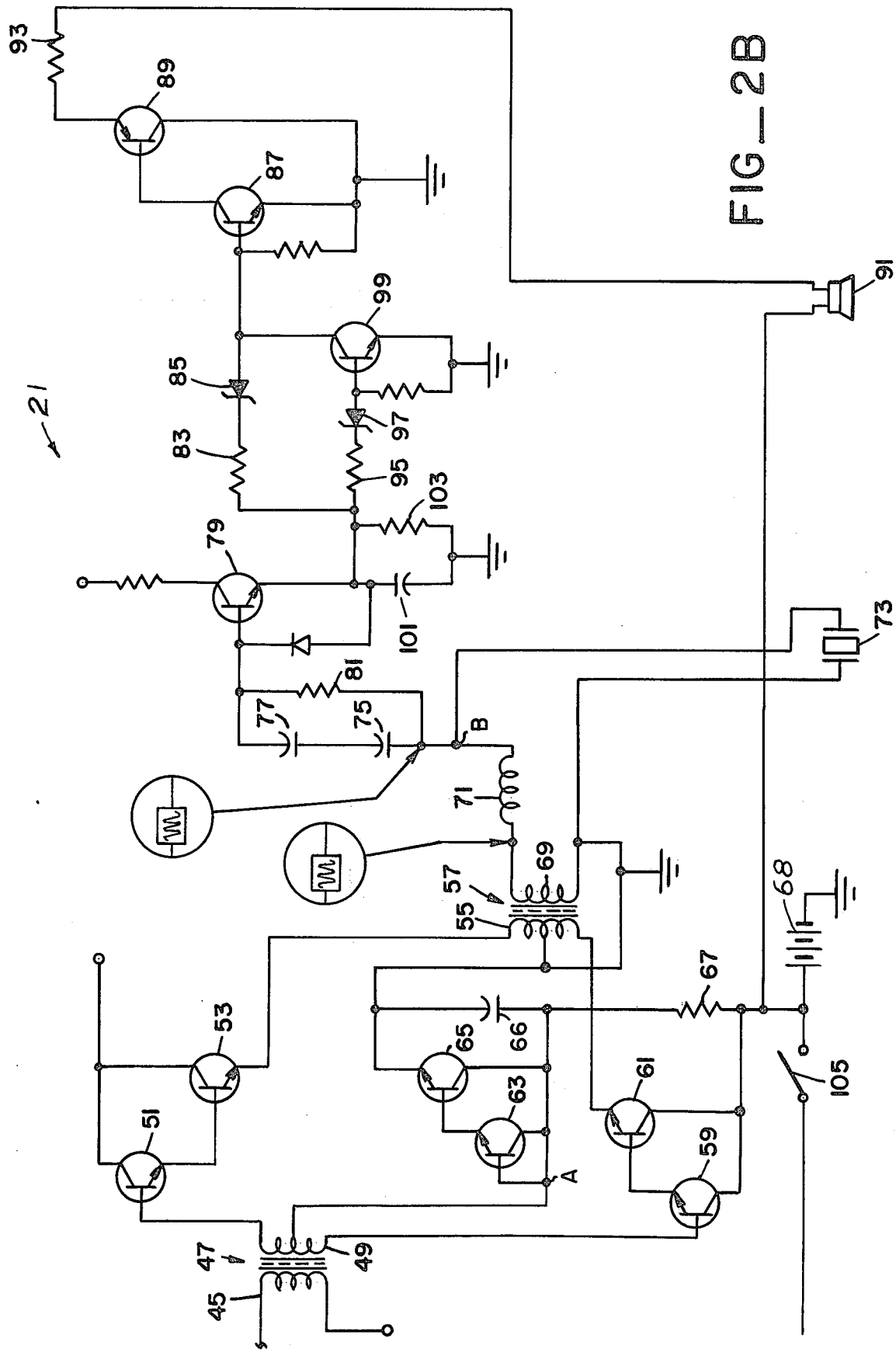
FIG_2B

TARGET SIMULATOR SYSTEM

BACKGROUND OF THE INVENTION

1. Field of the Invention.

The present invention relates to a target simulator system and more particularly to a target simulator system that simulates a moving target.

2. Description of the Prior Art.

Prior target simulator systems have principally consisted of transponder systems that have received and then returned an acoustic signal to a homing weapon. This has not proved to be a sufficiently realistic simulation for more modern faster moving targets and weapons. Moreover, these prior systems have not included means for monitoring the simulator system to assure that it is operating within acceptable amplification limits.

The present invention overcomes these problems by providing a target simulating system that simulates a moving target and employs an amplification limit monitor system.

SUMMARY OF THE INVENTION

The present invention relates to a target simulator system that may be suspended in the ocean to simulate a moving target to a homing weapon. The acoustic signal is then amplified, doppler shifted, filtered and then retransmitted by a transmitting transducer to the homing weapon. The doppler shift may be selected to have the retransmitted signal simulate a target that is moving towards or away from the homing weapon. The system includes a power compensating circuit and a monitor circuit to assure that the target simulator system is operating within acceptable amplification limits.

STATEMENT OF THE OBJECTS OF THE INVENTION

An object of the present invention is to provide a target simulation system that simulates a moving target;

another object of the present invention is to provide a target simulation system that compensates for temperature variations for holding power constant;

a further object of the present invention is to provide a target simulation system that includes a monitor to assure the simulation system is operating within acceptable amplification limits;

a still further object of the present invention is to provide a target simulation system that may be suspended in the ocean to simulate a moving target to an attacking weapon; and other objects, advantages and novel features of the present invention will become apparent from the following detailed description of the invention when considered in conjunction with the accompanying drawings.

BRIEF DESCRIPTION OF THE DRAWINGS

FIG. 1 is a pictorial drawing of the target simulating system of the present invention when suspended in the ocean; and FIGS. 2A and 2B are a schematic diagram of the target simulation system of the present invention.

DESCRIPTION OF THE PREFERRED EMBODIMENT

In FIG. 1 is illustrated a target simulator system 11 including radar reflector 13, float 15, counter balance 17, and acoustic transponder 19 and simulator 21 that are attached to tether 23. The target simulator system 11 is deployed in the ocean 25 wherein an attacking torpedo carrying aircraft or ship or the like launches a torpedo at the target simulator system in a simulated tactical situation. For example, aircraft or ships may home in on the deployed target simulator system 11 wherein radar signals will be reflected back to the aircraft or ships by radar reflector 13. Sonar signals from the ships will be received by the receiving element of the acoustic transponder 19 and transmitted back to the attacking ship by the transmitting element of the acoustic transponder 19. When the simulated target is located the torpedo is launched and homes in on simulator 21 of the present invention. Simulator 21, while free floating in the ocean will appear to the attacking torpedo to be moving towards or away from the attacking torpedo. The details of simulator 21 are hereinafter described and are shown in the schematic drawing of FIGS. 2A and 2B.

In FIGS. 2A and 2B is illustrated the schematic drawing of simulator 21 including an acoustic receiving transducer 27 which is connected to the input of input amplifier 29. The input signal would be normally a tone burst having a frequency $f_o$, which may be in the frequency range of from about 10kHz to about 100kHz, for example. The output of amplifier 29 is filtered by filter 31, to remove interfering frequencies, wherein the $f_o$ signal is applied to the input of balanced modulator 33. The output of oscillator 35, having a frequency $f_1$, is mixed with the received signal having a frequency $f_o$. Balanced modulator 33 provides a sum and difference output and other unwanted signals as illustrated in FIG. 2A which are filtered out by filter 37 which is tuned to the difference frequency $f_1 - f_o$. The $f_1 - f_o$ signal is applied to the input of balanced modulator 40. The output of oscillator 39, having a frequency $f_2$, is mixed with the frequency $f_1 - f_o$. Balanced modulator 40 provides a sum and difference output and other unwanted signals as illustrated in FIG. 2A which are filtered out by filter 41 which is tuned to the difference frequency $f_2 - (f_1 - f_o)$ or $f_o + (f_2 - f_1)$. As will be hereinafter explained the $(f_2 - f_1)$ frequency shift of the signal is the simulated motion by doppler shift. The $f_o + (f_2 - f_1)$ signal is connected to input winding 45 of transformer 47.

The upper tap of output winding 49 is applied to the base of transistor 51, the emitter of which is connected to the base of transistor 53, the emitter of which is connected to the upper tap of input winding 55 of transformer 57. The lower tap of output winding 49 is applied to the base of transistor 59, the emitter of which is connected to the base of transistor 61, the emitter of which is connected to the lower tap of imput winding 55 of transformer 57. The center tap of output winding 49 is applied to the base and collector of transistor 63 and to the collector of transistor 65. The center tap is also applied through resistor 67 to B+ power source 68. Constant DC current will pass through resistor 67 to transistors 63 and 65, allowing them to provide a temperature compensated bias point A for power output transistors 51, 53, 59 and 61. The emitter of transistor 63 is connected to the base of transistor 65 the emitter of which is connected to the center tap of input winding 55 of transformer 57. Capacitor 66 blocks the DC current from being applied to the center tap and therefore point voltage bias point for transistor pairs 51 and 53; 59 and 61; and 63 and 65. According to general practice, in the operating hardware transistors 51, 53, 59, 61, 63 and 65 are on the same chip or on the same circuit board and are therefore operating at about the same temperature. It should be noted that the transistor pairs have the same electrical connections (Darlington connections) and therefore the pairs have proportional input impedence characteristics. A change in temperature changes the impedence to transistor pair 63 and 65 and the voltage at A will therefore vary as a function of temperature, the base of transistor 63 being driven by a constant DC current source. Since the input impedence characteristics of transistor pair 63 and 65 are proportional to the input impedence characteristics of transistor pairs 51 and 53, and 59 and 61 the variable bias point A will compensate for changes in temperature and maintain the operating characteristics of transistor pairs 51 and 53, and 59 and 61 the same regardless of temperature changes. Therefore, the amplification factor and other operating characteristics will remain the same with a variable temperature environment.

The upper tap of output winding 69 is connected through tuning inductor 71 at point B to acoustic transmitting transducer 73. The lower tap of output winding 69 is also connected to acoustic transmitting transducer 73. Tuning inductor 71 is also connected at point B through capacitors 75 and 77 to the base of transistor 79. Two capacitors 75 and 77 are employed, rather than a single larger capacitor, to reduce the AC voltage drop for each capacitor. Connected in parallel across capacitors 75 and 77 is resistor 81 which reduces the AC voltage applied to the base of transistor 79. Capacitors 75 and 77 function to match the input impedance of transistor 79.

When transistor 79 is turned on it will provide a rectified AC output at frequency $f_o + (f_2 - f_1)$ that is proportional to the voltage at the output of tuning inductor 71. As the voltage output of transistor 79 increases, to a first predetermined voltage, the combination of resistor 83 and zener diode 85 will permit this first voltage to be applied to the base of transistor 87, which turns transistors 87 and 89 on. This in turn provides a ground connection on audible indicator 91 through resistor 93, transistor 89 to ground.

As the output voltage of transistor 79 increases further, then at a second predetermined voltage, the combination of resistor 95 and zener diode 97 will permit this second voltage to be applied to the base of transistor 99 which turns transistor 99 on. This shorts the base of transistor 87 to ground and causes transistors 87 and 89 to turn off which causes audible indicator 91 to turn off.

Capacitor 101 and resistor 103 convert the rectified AC output of transistor 79 into a DC signal that is applied to resistors 83 and 95.

Switch 105 connects oscillator 107 to B+ power source 68 wherein oscillator 107 supplies a test signal at frequency $f_o$ in series with transducer 27 to the base of amplifier 29. Potentiometer 109 provides a test signal amplitude adjustment for calibration purposes.

Therefore, when the simulator circuit is operating between acceptable voltage amplification limits, then the signal level at the output of tuning inductor 71 will turn on the monitor circuit transistors 79, 87 and 89 providing an audible alarm by audible indicator 91. When either below or above the acceptable voltage amplification limits then the audible indicator 91 will be turned off as previously explained. During operation the received acoustic signal by receiving transducer 27, at about a frequency $f_o$, will be amplified, doppler shifted and filtered, as previously explained to be transmitted by transmitting transducer 73 at $f_o +$ the simulated doppler shift of $(f_2 - f_1)$. It is to be understood that the doppler shift may be shifted upwards or downwards by making $f_1$ greater than $f_2$ or by making $f_2$ greater than $f_1$, respectively.

It is to be understood that the frequency $f_1$ of the oscillator 35 may be varied as a function of time to simulate a target that is varying in speed. This may be achieved by the use of a voltage controlled oscillator the input control of which is connected to the output of a voltage ramp generator, for example.

What is claimed is:
1. A target simulator system comprising:
   a. an acoustic receiving transducer for receiving a signal;
   b. first means operatively connected to the output of said acoustic receiving transducer for doppler shifting the output signal of said acoustic receiving transducer;
   c. said first means including a first balanced modulator, a first filter, a second balanced modulator and a second filter connected in series; a first oscillator connected to said first balanced modulator, a second oscillator connected to said second balanced modulator and an amplifier circuit;
   d. the output of said second filter being connected to the input of said amplifier circuit and the output of said amplifier circuit being connected in parallel to a first acoustic transmitting transducer and to a monitor circuit;
   e. said monitor circuit including a first voltage level detector means for detecting a first voltage level and a second voltage level detector means for detecting a second voltage level; the output of said first and second voltage level detector means applied to a gating circuit, said gating circuit being connected to a second acoustic transmitting transducer; whereby
   f. said second acoustic transmitting transducer provides an output signal only when the output of said amplifier circuit is between said first and second voltage levels.

2. The target simulator system of claim 1 wherein:
   a. said first voltage level detector means comprises a first resistor and a first zener diode connected in series; and
   b. said second voltage level detector means comprises a second resistor and a second zener diode connected in series.

3. The target simulator system of claim 1 wherein:
   a. said gating circuit includes at least a first transistor and a second transistor;
   b. the base of said first transistor being operably connected to the anode of said first zener diode the emitter of said first transistor being operably connected to said second acoustic transmitting transducer;
   c. the base of said second transistor being connected to the anode of said second zener diode and the collector-emitter of said second transistor being operably connected between the base of said first transistor and ground.

4. The target simulating system of claim 3 wherein:
   a. said amplifier circuit includes a first pair of transistors, a second pair of transistors, and a third pair of transistors each pair being connected to have a similar input impedence characteristic configuration;

b. the base of one of the transistors of said third pair being connected to a DC power source and providing a variable DC voltage bias point in response to variable temperatures; and c. said variable DC bias point being connected to the base of one of the transistors of said first pair and to the base of one of the transistors of said second pair.

* * * * *